(12) United States Patent
Willenegger

(10) Patent No.: US 7,936,690 B2
(45) Date of Patent: May 3, 2011

(54) METHOD AND APPARATUS FOR CONTROLLING TRANSMIT POWER OF MULTIPLE CHANNELS IN A CDMA COMMUNICATION SYSTEM

(75) Inventor: Serge Willenegger, Onnens (CH)

(73) Assignee: Qualcomm Incorporated, San Diego, CA (US)

( * ) Notice: Subject to any disclaimer, the term of this patent is extended or adjusted under 35 U.S.C. 154(b) by 1624 days.

(21) Appl. No.: 11/064,244

(22) Filed: Feb. 22, 2005

(65) Prior Publication Data
US 2005/0208961 A1    Sep. 22, 2005

Related U.S. Application Data

(63) Continuation of application No. 09/788,258, filed on Feb. 15, 2001, now Pat. No. 6,996,069.

(60) Provisional application No. 60/184,462, filed on Feb. 22, 2000.

(51) Int. Cl.
H04W 72/04 (2009.01)
H04B 7/216 (2006.01)
H04J 3/14 (2006.01)

(52) U.S. Cl. .......... 370/252; 370/335; 370/342; 455/69; 455/452.2; 455/522

(58) Field of Classification Search .................. 370/252, 370/335, 342; 455/69, 452.2, 522
See application file for complete search history.

(56) References Cited

U.S. PATENT DOCUMENTS

| 5,056,109 A | 10/1991 | Gilhousen et al. |
| 5,265,119 A | 11/1993 | Gilhousen et al. |
| 5,450,616 A | 9/1995 | Rom |
| 5,604,730 A | 2/1997 | Tiedemann, Jr. |
| 5,822,318 A | 10/1998 | Tiedemann, Jr. et al. |
| 5,903,554 A | 5/1999 | Saints et al. |
| 6,055,277 A * | 4/2000 | Stephens et al. ............... 375/285 |
| 6,088,347 A * | 7/2000 | Minn et al. .................... 370/342 |
| 6,097,972 A | 8/2000 | Saints et al. |
| 6,173,162 B1 * | 1/2001 | Dahlman et al. ............... 455/69 |

(Continued)

FOREIGN PATENT DOCUMENTS

EP    1011211    6/2000

(Continued)

OTHER PUBLICATIONS

International Search Report—PCT/US2002/004725, International Search authority- European Patent Office-Nov. 6, 2002.

(Continued)

*Primary Examiner* — Alpus H Hsu
(74) *Attorney, Agent, or Firm* — S. Hossain Beladi; Howard Seo

(57) ABSTRACT

Techniques to support independent power control of multiple channels in CDMA systems (e.g., a W-CDMA system) that define a single power control feedback stream on the uplink, which is to be used for downlink power control. In one aspect, the single feedback stream is "time shared" among multiple channels requiring individual power control. Various time-sharing schemes may be used to implement multiple (substantially parallel) feedback substreams based on the single feedback stream, and different combination of feedback rates may also be achieved for the substreams. Each feedback substream may be assigned to, and used for power control of, a respective channel. In another aspect, multiple feedback substreams are implemented based on multiple fields in newly defined slot formats.

73 Claims, 9 Drawing Sheets

U.S. PATENT DOCUMENTS

| | | | |
|---|---|---|---|
| 6,252,865 B1 | 6/2001 | Walton et al. | |
| 6,259,928 B1 * | 7/2001 | Vembu | 455/522 |
| 6,269,239 B1 | 7/2001 | Hashem et al. | |
| 6,285,886 B1 * | 9/2001 | Kamel et al. | 455/522 |
| 6,292,471 B1 | 9/2001 | Cao | |
| 6,330,456 B1 | 12/2001 | Hashem et al. | |
| 6,349,094 B1 * | 2/2002 | Vastano et al. | 370/328 |
| 6,373,823 B1 * | 4/2002 | Chen et al. | 370/252 |
| 6,396,867 B1 | 5/2002 | Tiedemann et al. | |
| 6,411,799 B1 * | 6/2002 | Padovani | 455/69 |
| 6,430,398 B1 * | 8/2002 | Blanc | 455/67.13 |
| 6,434,124 B1 * | 8/2002 | Rege | 370/311 |
| 6,493,564 B2 * | 12/2002 | Longoni et al. | 455/522 |
| 6,542,488 B2 | 4/2003 | Walton et al. | |
| 6,545,986 B1 * | 4/2003 | Stellakis | 370/318 |
| 6,628,956 B2 * | 9/2003 | Bark et al. | 455/522 |
| 6,633,552 B1 * | 10/2003 | Ling et al. | 370/318 |
| 6,754,506 B2 * | 6/2004 | Chang et al. | 455/522 |
| 6,757,320 B2 | 6/2004 | Tiedemann et al. | |
| 6,788,685 B1 * | 9/2004 | Holtzman et al. | 370/391 |
| 6,831,910 B1 | 12/2004 | Moon et al. | |
| 6,882,841 B1 | 4/2005 | Youn | |
| 6,914,889 B1 | 7/2005 | Qi Bi | |
| 6,970,716 B2 * | 11/2005 | Rune et al. | 455/552.1 |
| 6,983,166 B2 * | 1/2006 | Shiu et al. | 455/522 |
| 7,206,580 B2 | 4/2007 | Black | |
| 2001/0040880 A1 | 11/2001 | Chen | |
| 2003/0026219 A1 | 2/2003 | Moon et al. | |

FOREIGN PATENT DOCUMENTS

| | | |
|---|---|---|
| EP | 1067704 | 1/2001 |
| JP | 09036801 | 2/1997 |
| JP | 10173594 | 6/1998 |
| JP | 11205223 | 7/1999 |
| JP | 11313028 | 11/1999 |
| JP | 2000102052 | 4/2000 |
| JP | 2000183812 | 6/2000 |
| WO | 9858461 | 12/1998 |
| WO | 0077948 | 12/2000 |

OTHER PUBLICATIONS

International Preliminary Examination Report—PCT/US2002/004725, International Search Authority—European Patent Office—Mar. 5, 2003.

TIA/EIA-98-D; "Recommended Minimum Standard for Dual-Mode Wideband Spread Spectrum Cellular Mobile Station," Release A (Mar. 2001).

3GPP TS25.211 V3.2.0; "Technical Specification group Radio Access Network; Physical Channels and Mapping of transport channels onto physical channels (FDD)," 3GPP Release (Mar. 2000).

3GPP TS25.212 v3.2.0; "Technical Specification Group radio Access Network; Multiplexing and Channel Coding (FDD)." 3GPP Release (1999).

3GPP TS25.213 v3.2.0; "technical Specification Group Radio Access Network' Spreading and Modulation (FDD)," 3GPP Release (1999).

3GPP TS25.214 v3.2.0; "Technical Specification Group Radio Access Network; Physical layer procedures (FDD)," 3GPP (Release 1999).

3GPP2 C.S0002-A v. 2.0; "Physical Layer Standard for cdma2000 Spread Spectrum Systems Release A, Addendum 1," 3GPP2 Release (Jun. 9, 2000).

3GPP2 C.S0010-A V1.0; "Recommended Minimum Performance Standards for cdma2000 Spread Spectrum Base Stations Release A," 3GPP2 Release (Mar. 30, 2001).

3GPP2 C.S0024 v2.0; "cdma2000 High Rate Packet Data air Interface Specification," 3GPP2 Release (Oct. 27, 2000).

3GPP2 C.S0026; "Test Data Service Option (TDSO) for cdma2000 Spread Spectrum Systems," 3GPP2 Release (Mar. 30, 2001).

* cited by examiner

METHOD AND APPARATUS FOR CONTROLLING TRANSMIT POWER OF MULTIPLE CHANNELS IN A CDMA COMMUNICATION SYSTEM

CROSS REFERENCE TO RELATED APPLICATIONS

Claim of Priority Under 35 U.S.C. §120

The present Application for Patent is a Continuation and claims priority to patent application Ser. No. 09/788,258 entitled "METHOD AND APPARATUS FOR CONTROLLING TRANSMIT POWER OF MULTIPLE CHANNELS IN A CDMA COMMUNICATION SYSTEM" filed Feb. 15, 2001, pending, which claims priority to provisional U.S. Application Ser. No. 60/184,462, entitled "POWER CONTROL WITH DSCH," filed Feb. 22, 2000, and assigned to the assignee hereof and hereby expressly incorporated by reference herein.

BACKGROUND OF THE INVENTION

I. Field of the Invention

The present invention relates to data communication. More particularly, the present invention relates to novel and improved techniques for controlling transmit power of multiple channels in a CDMA communication system (e.g., a W-CDMA system).

II. Description of the Related Art

In a wireless communication system, a user with a user terminal (e.g., a cellular phone) communicates with another user through transmissions on the downlink and uplink via one or more base stations. The downlink (i.e., forward link) refers to transmission from the base station to the user terminal, and the uplink (i.e., reverse link) refers to transmission from the user terminal to the base station. The downlink and uplink are typically allocated different frequencies.

In a Code Division Multiple Access (CDMA) system, the total transmit power from a base station is typically indicative of the total downlink capacity since data may be concurrently transmitted to a number of users over the same frequency band. A portion of the total transmit power is allocated to each active user such that the aggregate transmit power for all users is less than or equal to the total available transmit power.

To maximize the downlink capacity, the transmit power to each user terminal may be controlled by a power control loop such that the signal quality, as measured by the signal-to-noise-plus-interference ratio (SNR), of a transmission received at the user terminal is maintained at a target SNR. This target SNR is often referred to as the power control setpoint (or simply, the setpoint). A second power control loop is typically employed to adjust the setpoint such that a desired level of performance, as measured by a frame error rate (FER), is maintained. The downlink power control mechanism thus attempts to reduce power consumption and interference while maintaining the desired link performance. This results in increased system capacity and reduced delays in serving users.

Many newer generation CDMA systems support concurrently transmission on multiple channels to provide high-speed data service and/or multiple services (e.g., voice and packet data). These channels may be used to transmit data at different data rates, and may further utilize different processing schemes. A feedback stream (or power control subchannel) may be allocated to each user terminal for power control of these channels. The feedback stream is typically used to send information indicative of the received signal quality for the transmission on one of the channels. This information may then be used by the base station to provide power control for all channels.

The power control becomes more challenging if the transmit power for multiple channels is not related by a defined relationship. This can result if the channels are not transmitted from the same set of base stations (i.e., different "handover" situation). For example, a first channel may be transmitted from a set of base stations using soft handoff, and a second channel may be transmitted from only one base station in the set. For the first channel, the user terminal collects and combines the transmit power from all transmitting base stations to recover the transmission, and power control for this channel is based on the combined power. And for the second channel, the power control should be based on the transmit power received from the single transmitting base station.

From the perspective of the base station transmitting the second channel, the transmit power for the two channels may not be correlated. Typically, the percentage contribution from individual base stations is not known for a channel in soft handoff. Thus, the amount this base station contributes to the first channel may not be known. If a single feedback stream is allocated and used to send power control information for the first channel, effective power control of the second channel is typically not possible based on this feedback stream. If the transmit power for the two channels is not correlated, the base station is unable to accurately adjust the transmit power for the second channel based on feedback information for the first channel.

As can be seen, techniques that can be used to effectively control the transmit power of multiple channels, which may be transmitted from different sets of base stations, are highly desirable.

SUMMARY OF THE INVENTION

Various power control techniques are provided herein to support independent power control of multiple channels to achieve the desired level of performance while reducing interference and maximizing system capacity. These techniques may be advantageously applied in CDMA systems (e.g., a W-CDMA system) that define a single power control feedback stream on the uplink, which is used for downlink power control. The techniques described herein can be used to implement multiple (substantially parallel) power control feedback substreams based on the single feedback stream. These feedback substreams may then be used to independently control the transmit power of channels assigned to the substreams.

In one aspect, the single feedback stream (e.g., as defined by the W-CDMA standard) is "time shared" among multiple channels requiring individual power control. Various time-sharing schemes may be used to implement multiple feedback substreams based on the single feedback stream, and different combination of feedback rates may also be achieved for the substreams. Each feedback substream may be assigned to, and used for power control of, a respective channel.

In another aspect, multiple feedback substreams are implemented based on multiple fields in newly defined slot formats. Various schemes may be used to form the feedback substreams, and each feedback substream may be used for power control of a respective channel.

The invention further provides methods, power control units, and other elements that implement various aspects and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE SPECIFIC EMBODIMENTS

Figure 1:
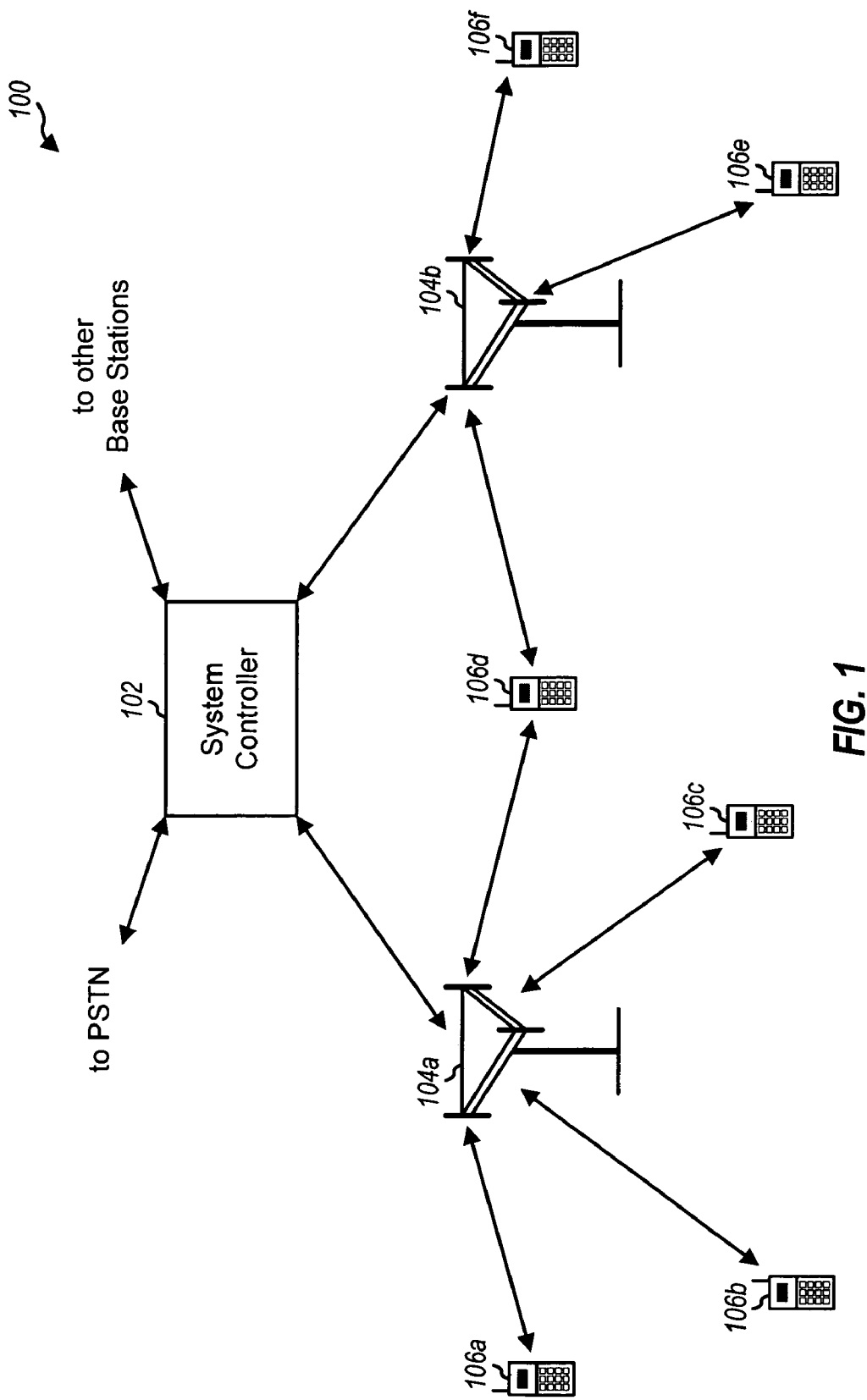
FIG. 1 is a diagram of a wireless communication system that supports a number of users.

FIG. 1 is a diagram of a wireless communication system 100 that supports a number of users. System 100 provides communication for a number of cells, with each cell being serviced by a corresponding base station 104. Various user terminals 106 are dispersed throughout the system. Each user terminal 106 may communicate with one or more base stations 104 on the downlink and uplink at any particular moment, depending on whether or not the user terminal is active and whether or not it is in soft handoff. As shown in FIG. 1, base station 104a communicates with user terminals 106a, 106b, 106c, and 106d, and base station 104b communicates with user terminals 106d, 106e, and 106f. User terminal 106d is in soft handoff and concurrently communicates with base stations 104a and 104b.

In system 100, a system controller 102 couples to base stations 104 and may further couple to a public switched telephone network (PSTN) and/or one or more packet data networks (PDN). System controller 102 provides coordination and control for the base stations coupled to it. System controller 102 further controls the routing of telephone calls among user terminals 106, and between user terminals 106 and the users coupled to PSTN (e.g., conventional telephones), via base stations 104. System controller 102 is often referred to as a base station controller (BSC) or a radio network controller (RNC).

System 100 may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the "TIA/EIA-98-D Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (4) the standard offered by a consortium named "3rd Generation Partnership Project 2" (3GPP2) and embodied in a set of documents including Document Nos. C.S0002-A, C.S0005-A, C.S0010-A, C.S0011-A. C.S0024, and C.S0026 (the cdma2000 standard), and (5) some other standards. These standards are incorporated herein by reference.

Figure 2A:
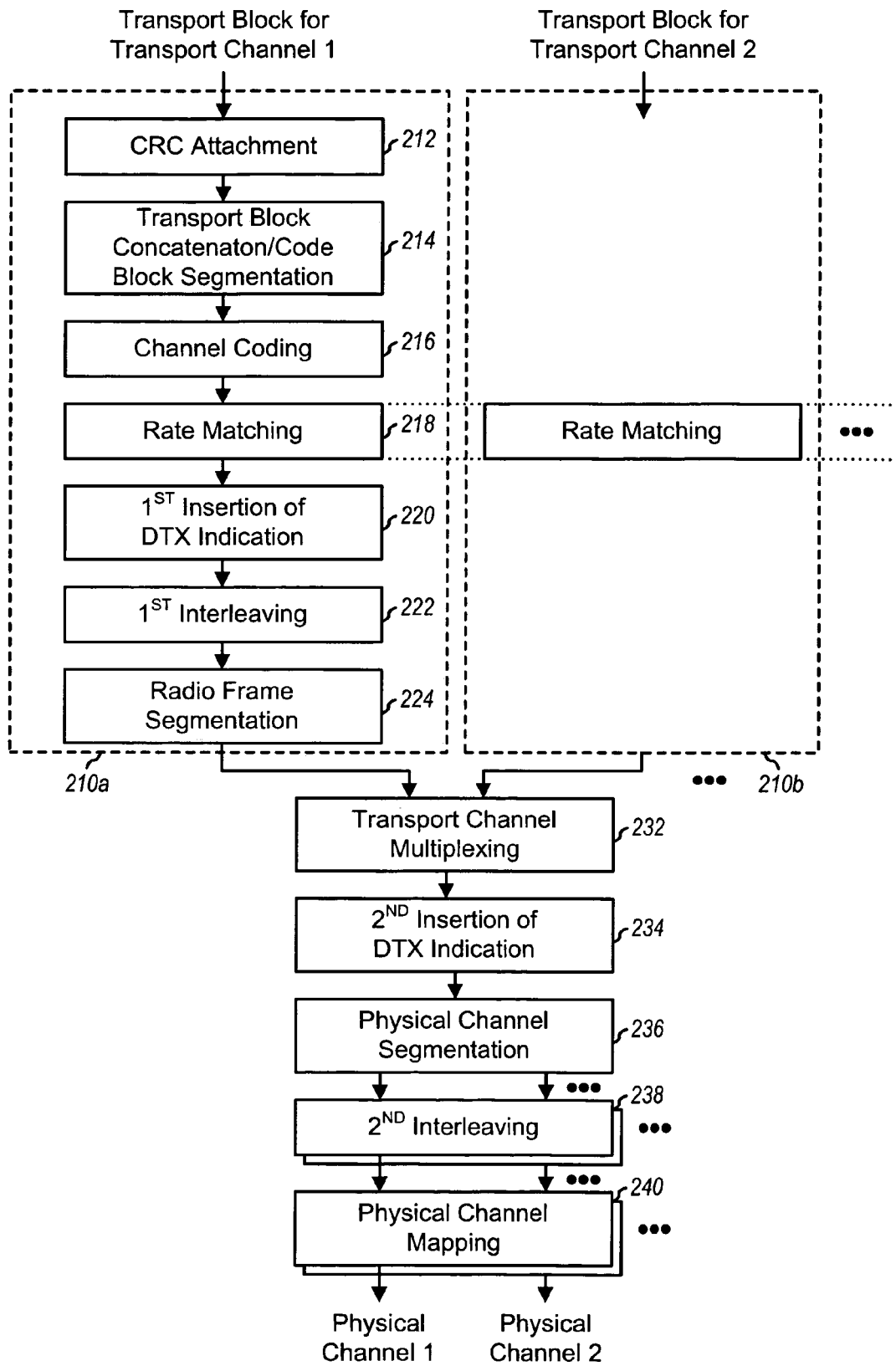
FIGS. 2A and 2B are diagrams of the signal processing at a base station and a user terminal, respectively, for a downlink data transmission in accordance with the W-CDMA standard.

FIG. 2A is a diagram of the signal processing at base station 104 for a downlink data transmission, in accordance with the W-CDMA standard. The upper signaling layers of a W-CDMA system support concurrent transmission of a number of "transport" channels, with each transport channel capable of carrying data for a particular communication (e.g., voice, video, data, and so on). The data for each transport channel is provided, in blocks that are also referred to as transport blocks, to a respective transport channel processing section 210.

Within transport channel processing section 210, each transport block is used to calculate cyclic redundancy check (CRC) bits, in block 212. The CRC bits are attached to the transport block and used at the user terminal for error detection. A number of CRC coded blocks are then serially concatenated together, in block 214. If the total number of bits after concatenation is greater than the maximum size of a code block, the bits are segmented into a number of (equal-sized) code blocks. Each code block is then coded with a particular coding scheme (e.g., a convolutional code, a Turbo code) or not coded at all, in block 216, to generate coded bits.

Rate matching is then performed on the coded bits in accordance with a rate-matching attribute assigned by higher signaling layers, in block 218. On the uplink, bits are repeated or punctured (i.e., deleted) such that the number of bits to be transmitted matches the number of available bit positions. On the downlink, unused bit positions are filled with discontinuous transmission (DTX) bits, in block 220. The DTX bits indicate when a transmission should be turned off and are not actually transmitted.

The bits are then interleaved in accordance with a particular interleaving scheme to provide time diversity, in block 222. In accordance with the W-CDMA standard, the time interval over which interleaving is performed can be selected from a set of possible time intervals (i.e., 10 msec, 20 msec, 40 msec, or 80 msec). When the selected interleaving interval is longer than 10 msec, the bits within the interval are segmented and mapped onto consecutive transport channel radio frames, in block 224. Each transport channel radio frame corresponds to a transmission over a (10 msec) radio frame period.

The radio frames from all active transport channel processing sections 210 are then serially multiplexed into a coded composite transport channel (CCTrCH), in block 232. DTX bits may then be inserted to the multiplexed radio frames such that the number of bits to be transmitted matches the number of available bit positions on the "physical" channel(s) used for the data transmission, in block 234. If more than one physical channel is used, the bits are segmented among the physical channels, in block 236. The bits in each radio frame period for each physical channel are then interleaved to provide additional time diversity, at block 238. The interleaved physical channel radio frames are then mapped to their respective physical channels, at block 240. Each physical channel may be used to transmit a particular transmission for a particular data type, as described below. The subsequent signal processing to generate a modulated signal suitable for transmission to the user terminal is known in the art and not described herein.

Figure 2B:
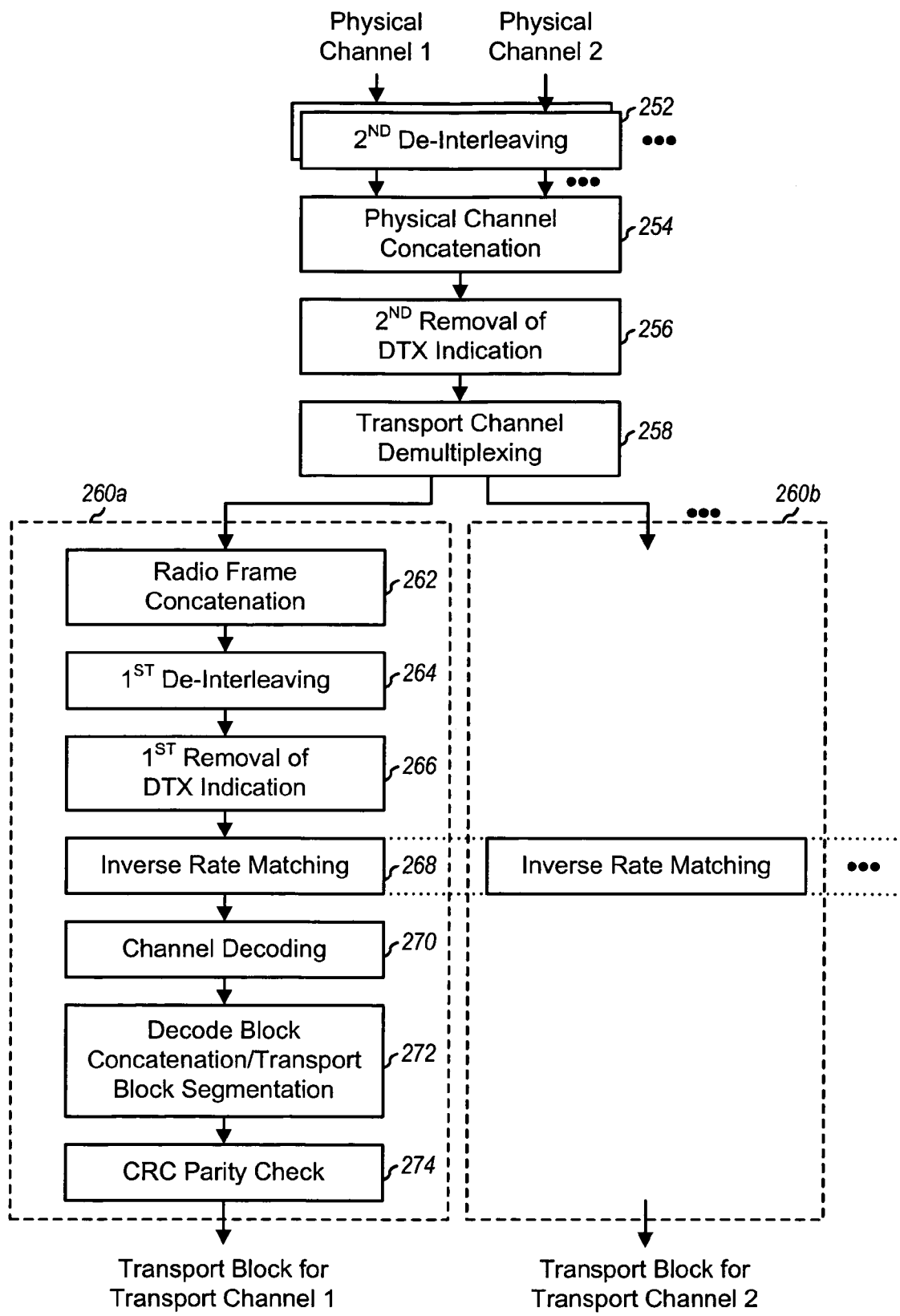

FIG. 2B is a diagram of the signal processing at user terminal 106 for a downlink data transmission, in accordance with the W-CDMA standard. The signal processing shown in FIG. 2B is complementary to that shown in FIG. 2A. Initially, the modulated signal is received, conditioned, digitized, and processed to provide symbols for each physical channel used for the data transmission. Each symbol has a particular resolution (e.g., 4-bit) and corresponds to a transmitted bit. The symbols in each radio frame period for each physical channel are de-interleaved, in block 252, and the de-interleaved symbols from all physical channels are concatenated, in block 254. For a downlink transmission, non-transmitted bits are detected and removed, in block 256. The symbols are then demultiplexed into various transport channels, in block 258. The radio frames for each transport channel are then provided to a respective transport channel processing section 260.

Within transport channel processing section 260, the transport channel radio frames are concatenated into "traffics", in block 262. Each traffic includes one or more transport channel radio frames and corresponds to the selected interleaving interval used at the transmitter unit. The symbols within each traffic are de-interleaved, in block 264, and non-transmitted symbols are removed, in block 266. Inverse rate matching is then performed to accumulate repeated symbols and insert "erasures" for punctured symbols, in block 268. Each coded block in the traffic is then decoded, in block 270, and the decoded blocks are concatenated and segmented into their respective transport blocks, in block 272. Each transport block is then checked for error using the CRC bits, in block 274.

The W-CDMA standard defines a channel structure capable of supporting a number of users and designed for efficient transmission of voice and packet data. In accordance with the W-CDMA standard, data to be transmitted is processed as one or more transport channels at a higher signaling layer. The transport channels support concurrent transmission of different types of services (e.g., voice, video, data, and so on). The transport channels are then mapped to physical channels that are assigned to a user terminal for a communication (e.g., a call).

For each communication in a W-CDMA system, a downlink dedicated physical channel (downlink DPCH) is typically assigned to the user terminal for the duration of the communication. The DPCH is used to carry a downlink transport channel characterized by the possibility of fast data rate change (e.g., every 10 msec), fast power control, and inherent addressing to specific user terminal.

If additional transmission capability is needed, a physical downlink shared channel (PDSCH) may also be assigned to the user terminal. For example, the PDSCH may be assigned for high rate packet data transmission. The PDSCH is used to carry a downlink transport channel shared by user terminals based on code multiplexing. The PDSCH is associated with the downlink DPCH. However, the PDSCH and DPCH do not need to have the same spreading factor (i.e., orthogonal code, which determines the data rate), and the spreading factor for the PDSCH may also vary from frame-to-frame.

The downlink DPCH is used to transmit user-dedicated data in a time-division multiplexed manner with control data (e.g., pilot, power control information, and so on). The downlink DPCH may thus be viewed as a multiplex of a downlink dedicated physical data channel (DPDCH) and a downlink dedicated physical control channel (DPCCH).

On the downlink, the capacity of each base station is limited by its total transmit power. To provide the desired level of performance and increase system capacity, the transmit power of each transmission from the base station may be controlled to be as low as possible to reduce power consumption while maintaining the desired level of performance. If the received signal quality at the user terminal is too poor, the likelihood of correctly decoding the transmission decreases, and performance may be compromised (e.g., a higher FER). Conversely, if the received signal quality is too high, the transmit power level is also likely to be too high, and excessive amount of transmit power may have been unnecessarily used for the transmission, which reduces system capacity and may further cause extra interference to transmissions from other base stations.

Figure 3:
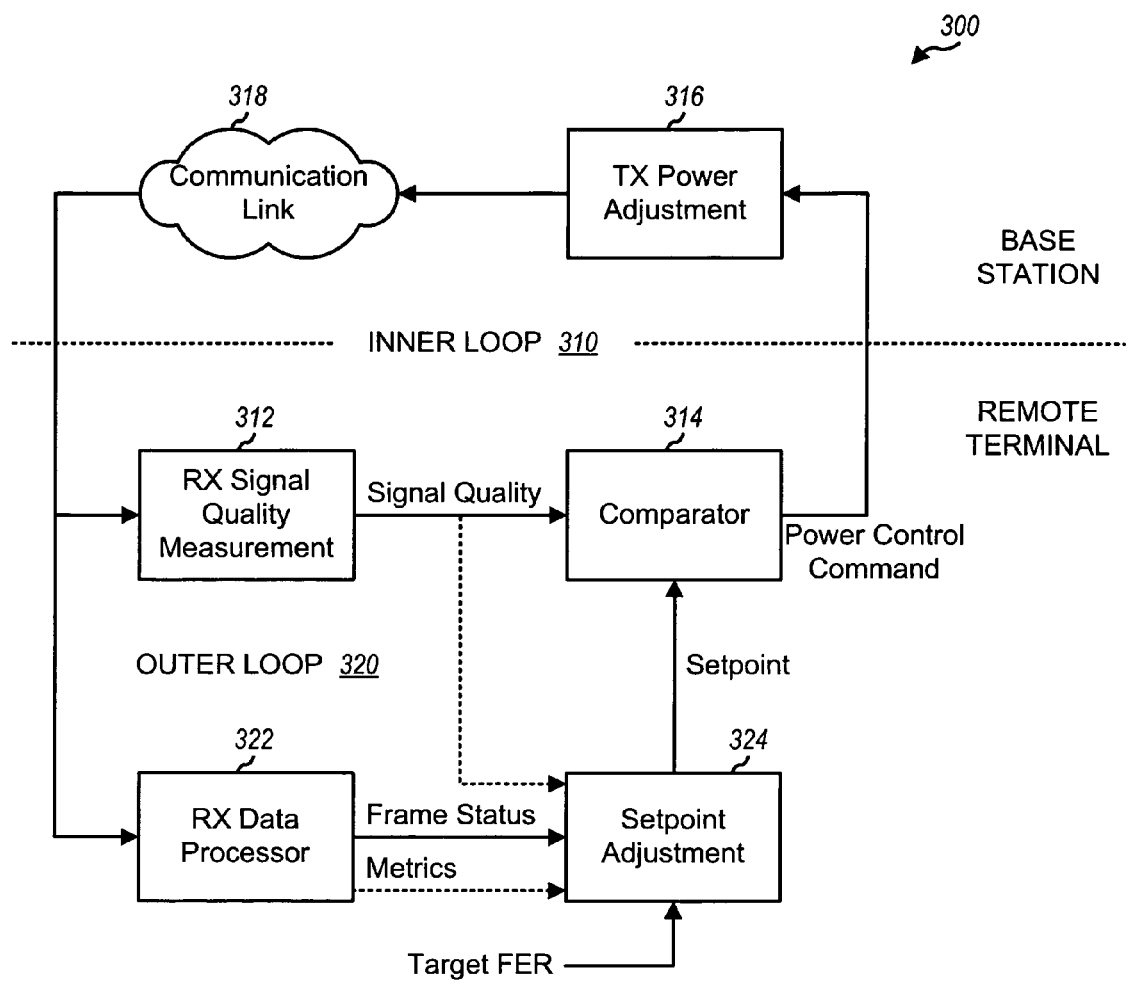
FIG. 3 is a diagram of a downlink power control mechanism capable of implementing various aspects and embodiments of the invention.

FIG. 3 is a diagram of a downlink power control mechanism 300 capable of implementing various aspects and embodiments of the invention. Power control mechanism 300 includes an inner loop power control 310 that operates in conjunction with an outer loop power control 320.

Inner loop 310 is a (relatively) fast loop that attempts to maintain the signal quality of a transmission received at the user terminal as close as possible to a target signal-to-noise-plus-interference ratio (SNR). As shown in FIG. 3, inner loop 310 operates between the user terminal and base station, and one inner loop is typically maintained for each channel to be independently power controlled.

The inner loop power adjustment for a particular channel is typically achieved by (1) measuring the signal quality of the transmission on the channel at the user terminal (block 312), (2) comparing the received signal quality against the channel's setpoint (block 314), and (3) sending power control information back to the transmitting base station. The signal quality measurement may be made on the channel to be power controlled, a reference channel associated with the channel to be power controlled, or any other channel for which a relationship can be established with the channel to be power controlled. The power control information may be used by the transmitting base station to adjust its transmit power, and may be in the form of, for example, an "UP" command to request an increase in the transmit power or a "DOWN" command to request a decrease in the transmit power. The base station may adjust the transmit power for the channel accordingly (block 316) each time it receives the power control information. For the W-CDMA system, the power control information may be sent as often as 1500 times per second, thus providing a relatively fast response time for inner loop 310.

Due to path loss in the communication link (cloud 318) that typically varies over time, especially for a mobile user terminal, the received signal quality at the user terminal continually fluctuates. Inner loop 310 thus attempts to maintain the received signal quality at or near the setpoint in the presence of changes in the communication link.

Outer loop 320 is a (relatively) slower loop that continually adjusts the setpoint such that a particular level of performance is achieved for the transmission to the user terminal. The desired level of performance is typically a target frame error rate (FER), which is 1% for some transmissions. Some other target values and/or performance criteria may also be used to adjust the setpoint.

The outer loop setpoint adjustment for a particular channel is typically achieved by (1) receiving and processing the transmission on the channel to recover transmitted frames, (2) determining the status of each received frame (block 322) as being decoded correctly (good) or in error (erased), and (3) adjusting the setpoint (block 324) based on the frame status (and possibly along with other information). If a frame is decoded correctly, the received signal quality at the user terminal is likely to be higher than necessary. The setpoint may then be reduced slightly, which may cause inner loop 310 to reduce the transmit power for the transmission. Alternatively, if a frame is decoded in error, the received signal quality at the user terminal is likely to be lower than necessary. The setpoint may then be increased, which may cause inner loop 310 to increase the transmit power for the transmission.

By controlling the manner in which the channel's setpoint is adjusted, different power control characteristics and performance level may be obtained. For example, the target FER may be adjusted by changing the amount of upward adjustment in the setpoint for a bad frame, the amount of downward adjustment for a good frame, the required elapsed time between successive increases in the setpoint, and so on. The target FER (i.e., the long-term FER) may be set as $\Delta D/(\Delta D + \Delta U)$, where $\Delta U$ is the amount of increase in the setpoint for an erased frame, and $\Delta D$ is the amount of decrease in the setpoint for a good frame. The absolute sizes for $\Delta U$ and $\Delta D$ determine the responsiveness of the system to sudden changes in the communication link.

For the W-CDMA system, the user terminal estimates the SNR of the transmission on the DPCCH/DPDCH (i.e., the downlink DPCH). The user terminal then compares the estimated SNR to the target SNR and generates transmit power control (TPC) commands to increase or decrease the transmit power if the estimated SNR is respectively less than or greater than the target SNR. In response to receiving the TCP command, the base station may adjust the transmit power of the DPCCH/DPDCH.

The ratio of the transmit power for different downlink channels to the same user terminal is not specified in the W-CDMA system and may change with time. In a common operating scenario, the PDSCH and downlink DPCH are transmitted from one base station. In this case, the transmit power of the PDSCH may be controlled based on the TPC commands generated for the downlink DPCH (i.e., based on the inner power control loop maintained for the downlink DPCH). The base station has knowledge of the processing performed for the PDSCH and downlink DPCH, and is able to determine the target SNR for each of these channels. The base station is also able to scale the transmit power for these channels accordingly to achieve the target SNR.

Power control of the PDSCH and downlink DPCH based on the same TPC commands works well when both channels are transmitted from the same set of base stations (e.g., from one base station). However, this scheme is typically not appropriate for soft handoff scenarios. The W-CDMA standard allows for operation of the downlink DPCH in soft handoff, but presently does not allow for operation of the PDSCH in soft handoff. The PDSCH and its associated downlink DPCH may therefore be operated in different handoff modes.

If the downlink DPCH is in soft handoff, the user terminal collects and combines the transmit power from a set of base stations to recover the transmission on the DPCH. The power control for the DPCH is then based on the total power for the DPCH received from all transmitting base stations. The specific percentage contribution from individual base stations may not be known to the system controller. Thus, if one of the base stations in the set also transmits the PDSCH, the amount of transmit power to be used for the PDSCH is not correlated to, or determinable from, its transmit power for the PDCH. The transmit power for the PDSCH may be incorrectly controlled if based on the TPC commands received for the DPCH, and adjustment of the PDSCH transmit power based on these TPC commands would likely result in random allocation of PDSCH transmit power (relative to the actual required allocation). This random allocation would be detrimental to the link quality and system capacity, and is therefore highly undesirable.

Several simple schemes may be used to control the PDSCH transmit power if it is not correlated to the DPCH transmit power. In one scheme, the PDSCH transmit power is boosted to a sufficient level to ensure correct reception. However, this would require the PDSCH to be transmitted at a high power level to safeguard against worse case path loss and operating scenarios. In another simple scheme, a fixed power allocation is used for the PDSCH. However, performance would likely suffer as channel condition changes. In yet another simple scheme, messaging is used to control the PDSCH transmit power (e.g., using the frame erasure information transmitted on the uplink). However, this power control mechanism is slow and may not adequately adapt to changing link conditions, which may again result in performance degradation. These simple schemes are thus not effective for power control of multiple channels.

As noted above, the PDSCH is typically used for high rate packet data transmissions, and the average transmit fraction required to provide the desired quality of service may represent a non-negligible fraction of the total transmit power from the base station. For example, the average power fraction requirement for high rate channels may be 13 dB (5% of the total base station transmit power) or more.

For the PDSCH and downlink DPCH, a fast power control loop (i.e., the inner loop) may be used to adjust the transmit power of each of these channels inversely with respect to the link condition (i.e., more transmit power if the link worsens). This ensures that the received signal quality at the base station is maintained at or near the target SNR. The fast power control loop allows for quick adjustment of the transmit power to track rapidly changing link conditions.

Lower power control rates may be sufficient for certain high rate channels. The dynamic range of single path Rayleigh fading is in the order of 10 to 20 dB. If the average power fraction requirement is 13 dB or more, the base station is typically not able to compensate for such a wide range of fading since it would either run out of power or would need to drop other users to provide the required transmit power. Thus, for high rate channels such as the PDSCH, it may not be essential to send power control commands at a high rate since in many instances the base station would not have the power resources available to implement the commands.

Various power control techniques are provided herein to support independent power control of multiple channels to achieve the desired level of performance while reducing interference and maximizing system capacity. These techniques may be advantageous applied in CDMA systems (e.g., the W-CDMA system) that define a single power control feedback stream on the uplink, which is used for downlink power control. The techniques described herein can be used to implement multiple (substantially parallel) power control feedback substreams based on the single power control feedback stream. These feedback substreams may then be used to independently control the transmit power of channels assigned to the substreams.

In accordance with one aspect, the single power control feedback stream (e.g., as defined by the W-CDMA standard) is "time shared" among multiple channels requiring individual power control. Various time-sharing schemes may be used to implement multiple feedback substreams based on the single feedback stream, as described below. Each feedback substream may then be assigned to, and used for power control of, a respective channel.

In accordance with another aspect, multiple feedback substreams are implemented based on multiple fields in newly defined slot formats. Various schemes may be used to form the feedback substreams, and each feedback substream may be used for power control of a respective channel, as described below.

The power control techniques described herein can be used for various wireless communication systems, and may be advantageously employed for the downlink and/or uplink. For example, the power control techniques described herein may be used for CDMA systems that conform to the W-CDMA standard, the cdma2000 standard, some other standard, or a combination thereof. For clarity, various aspects and embodiments of the invention are described below for a specific implementation on the downlink of a W-CDMA system.

Figure 4:
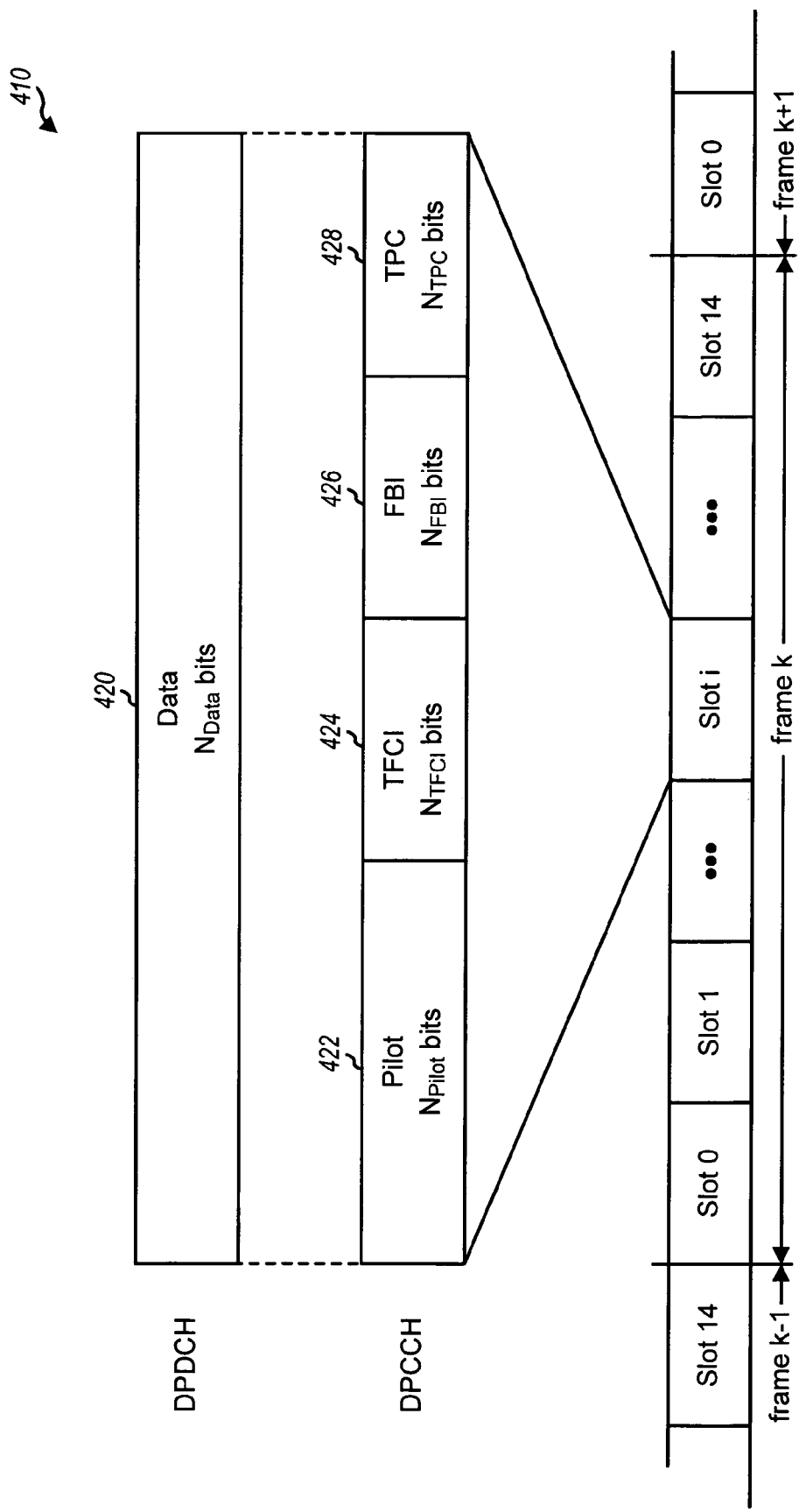
FIG. 4 is a diagram of a frame format and a slot format for an uplink physical dedicated channel, as defined by the W-CDMA standard.

FIG. 4 is a diagram of a frame format and a slot format for the DPDCH and DPCCH of the uplink DPCH, as defined by the W-CDMA standard. The DPDCH carries user-dedicated packet data, and the DPCCH carries control data (including power control information for the downlink channels). On the uplink, the DPDCH and DPCCH are respectively transmitted on the inphase (I) and quadrature (Q) components of a modulated uplink signal. The transmissions on the DPDCH and DPCCH are partitioned into radio frames, with each radio frame covering 15 slots labeled as slot 0 through slot 14. For the DPCCH, each slot is further partitioned into a number of fields used to carry different types of control data.

As shown in FIG. 4, the DPDCH includes a data field 420 used to send data from the user terminal. The DPCCH includes a pilot field 422, a transport format combination indicator (TFCI) field 424, a feedback information (FBI) field 426, and a transmit power control (TPC) field 428. Pilot field 422 is used to send a pilot for the dedicated physical channel. TFCI field 424 is used to send instantaneous parameters (e.g., the bit rate, channelization code, and so on) of the transport channels multiplexed on the uplink DPDCH. FBI field 426 is used to support techniques requiring feedback between the user terminal and base station, such as various transmit diversity modes. And TPC field 428 is used to send power control information to direct the base station to adjust its transmit power on the downlink channels either up or down to achieve the desired performance while minimizing interference.

In accordance with an aspect of the invention, multiple parallel power control feedback substreams are implemented by time-sharing a single power control feedback stream. As defined by the W-CDMA standard, each frame has a duration of 10 msec, and each slot has a duration of 1.67 msec. The slot rate is thus 1500 slots/sec. As shown in FIG. 4, each slot includes TPC field 428 for reporting power control information. If a TPC command is sent once each slot, the feedback stream has a rate of 1500 commands/sec (i.e., 1500 cps). The 1500 cps may be used to implement multiple feedback substreams in a time-shared manner, as described below.

Figure 5A:
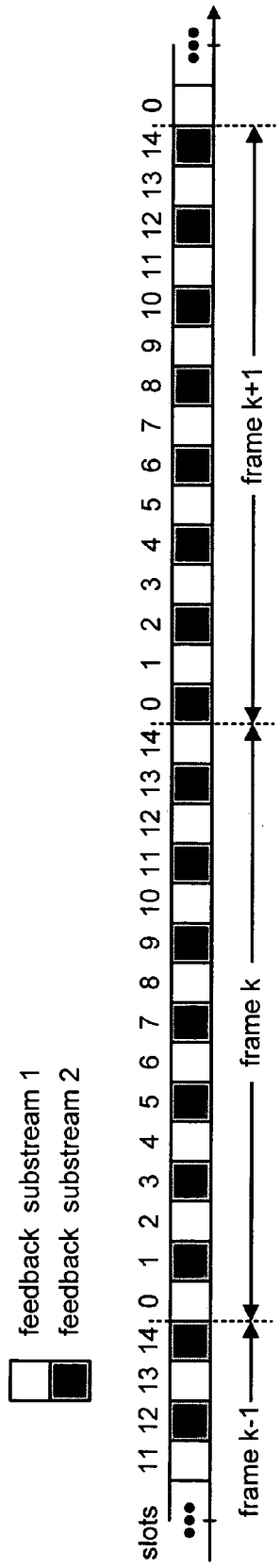
FIGS. 5A through 5D show the formation of two feedback substreams based on a single power control feedback stream, for four different feedback rate combinations.

FIGS. 5A through 5D are diagrams illustrating four different time-shared formats for providing multiple feedback substreams based on the single feedback stream, in accordance with certain embodiments of the invention. In FIG. 5A, two feedback substreams are supported based on the single feedback stream, with the commands for the two substreams being transmitted on alternate slots. As shown in FIG. 5A, the commands for the first feedback substream are transmitted in slots 0, 2, 4, . . . and 14 of frame k, and slots 1, 3, 5, . . . and 15 of frame k+1. The commands for the second feedback substream are transmitted in slots 1, 3, 5, . . . and 15 of frame k and slots 0, 2, 4, . . . and 14 of frame k+1. If the feedback stream has a rate of 1500 cps, then each feedback substream has a rate of 750 cps.

Figure 5B:
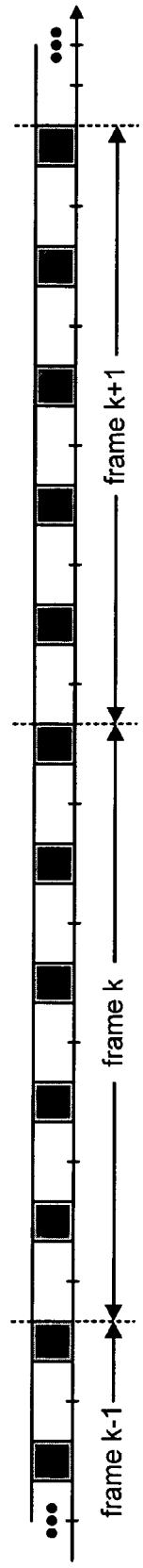

In FIG. 5B, the two feedback substreams are assigned to slots in a manner to provide feedback rates of 1000 cps and 500 cps for the first and second substreams, respectively. This is achieved by transmitting two commands in two consecutive slots for the first substream, followed by a single command in one slot for the second substream, and repeating the pattern.

Figure 5C:
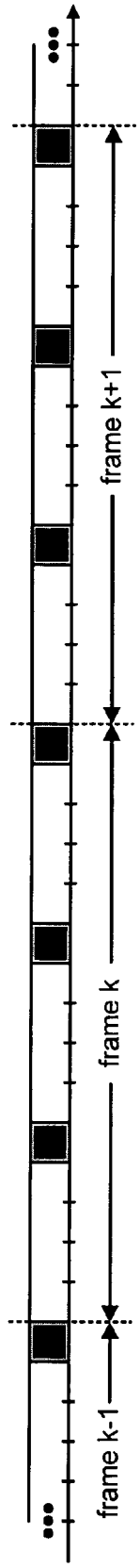

In FIG. 5C, the two feedback substreams are assigned to slots in a manner to provide feedback rates of 1200 cps and 300 cps for the first and second substreams, respectively. This is achieved by transmitting four commands in four consecutive slots for the first substream, followed by a single command in one slot for the second substream, and repeating the pattern.

Figure 5D:
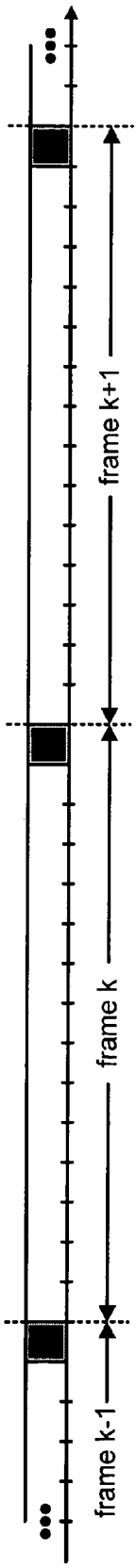

And in FIG. 5D, the two feedback substreams are assigned to slots in a manner to provide feedback rates of 1400 cps and 100 cps for the first and second substreams, respectively. This is achieved by transmitting 14 commands in 14 slots for the first substream and a single command in one slot for the second substream.

Based on the above, it can be observed that two parallel feedback substreams of various combinations of rates may be supported by properly assigning the slots to the substreams. FIGS. 5A-5D also show the use of repeating slot assignment patterns for the two substreams, with the patterns being periodic within one or two frames. In particular, FIG. 5A uses a "1-1" pattern for 750/750 feedback rates, FIG. 5B uses a "2-1" pattern for 1000/500 feedback rates, FIG. 5C uses a "4-1" pattern for 1200/300 feedback rates, and FIG. 5D uses a "14-1" pattern for 1400/100 feedback rates. The slot assignment patterns of "1-1", "2-1", and "4-1" are replicated as many times as needed for each frame.

Other feedback rates may also be supported by use of other slot assignment patterns that may be periodic over multiple frames (i.e., similar to the "1-1" pattern, which is periodic over two frames). For example, feedback rates of 1125 cps and 375 cps for the first and second substreams, respectively, may be achieved by transmitting three commands in three consecutive slots for the first substream, followed by a single command in one slot for the second substream, and repeating the pattern. Alternatively, non-periodic patterns may also be used to form the feedback substreams.

FIGS. 5A through 5D show the formation of two feedback substreams based on the single feedback stream. In general, any number of feedback substreams may be formed by properly assigning the slots. For example, three feedback substreams of 500/500/500 cps may be supported by using a "1-1-1" pattern, whereby a single command for each of the first, second, and third substreams is transmitted in every third slot. Each of the substreams may then be assigned to, and used for sending power control information for, a respective channel. Again, any number of substreams and any combination of feedback rates may be supported, so long as the aggregate rate of the substreams is equal to or less than the rate of the feedback stream. The substreams may have the same or different feedback rates, as illustrated above.

The feedback substreams may be defined (i.e., assigned with slots) based on various schemes. In one scheme, the substreams are defined a priori. Different time-shared formats may be used to define the feedback substreams, such as the ones shown above for FIGS. 5A-5D. The user terminal is informed, or otherwise made aware, of the particular time-shared format to use for a communication with the base station. For example, the user terminal may know to use the 1000/500 cps feedback substreams when the PDSCH and downlink DPCH are both in use and in a different handover situation (i.e., the PDSCH and DPCH are transmitted from different sets of cells). If the handover situation is the same (e.g. no handover, or handover with the same cell set), there is typically no need to differentiate the feedback substreams. However, multiple feedback substreams may still be used for any number of reasons such as, for example, to obviate the need to change the uplink configuration each time the downlink configuration is changed.

In another scheme, the feedback substreams may be defined based on negotiation between the base station and user terminal (e.g., at the start of a communication, or as channels are added or removed during the communication). This scheme provides flexibility in forming feedback substreams. The substreams may be defined based on the performance level to be achieved, the link conditions, and other factors.

The feedback substreams may be assigned to the channels in any desired manner. In one implementation, the feedback substream with the lower rate is assigned and used for power control of the PDSCH, and the higher rate feedback substream is used for power control of the downlink DPCH. This may ensure less performance degradation for the downlink DPCH, which carries important control (e.g., the TFCI) and signaling messages used to control both the DPCH and PDSCH.

The multiplexing of power control information (e.g., TPC commands) for the two feedback substreams into the available slots for the feedback stream effectively reduces the feedback rates (e.g., to 750/750 cps) for the downlink DPCH and PDSCH. Based on earlier studies performed for IS-95 systems, the reduction in feedback rate has minimal impact on performance when the user terminal is moving at lower or higher speeds where the link variation is respectively slow and easy to track (e.g., even for 750 cps) or too rapid and difficult to correct. (If the fading is too fast at high velocities, even 1500 cps power control may be insufficient, in which case the channel interleavers average out the effect of fading.) The reduced feedback rate would most likely affect performance if the user terminal is moving at mid-range speeds (e.g., 30-60 km/hr). At these speeds, prior studies indicate that the impact on performance can be expected to be in the order of 0.5 dB or less in many instances.

Since fast power control of the PDSCH may not be possible or practical in certain scenarios (e.g., when the PDSCH is used for high rate packet data transmission), a lower feedback rate may be sufficient for this channel. For example, a feedback rate of 500, 300, or 100 cps may provide good performance for the PDSCH while reducing the feedback rate for the DPCH by an acceptable amount. If the feedback rate for the PDSCH is 500 cps or less, the feedback rate for the DPCH is still relatively high at 1000 cps or more. This allows the DPCH to be power controlled at a relatively high rate, which may reduce performance degradation to few tenths of a dB in the mid-range speeds. Again, the lower feedback rate for the PDSCH may provide the requisite level of performance and may be sufficient, especially if the base station is not able to apply commands at faster rate due to other considerations and/or limitations.

For the feedback substreams implemented based on time-sharing of the single feedback stream, the same defined slot format may be used for the substreams. TPC commands for the feedback substreams may be generated and transmitted in the TPC field in similar manner as that used for the feedback stream. However, both the user terminal and base station know which command belongs to which substreams, and are able to respectively generate and process the commands.

In accordance with another aspect of the invention, multiple parallel feedback substreams are implemented by defining multiple TPC fields in a slot. One or more TPC fields may be defined in addition to the original TPC field for the power control feedback stream. Each TPC field may then be assigned to a respective channel.

The W-CDMA standard defines a number of slot formats that may be used for the uplink DPCCH. Each slot format allocates a specific number of bits to each of the control fields in the uplink DPCCH shown in FIG. 4. The particular slot format to be used for a communication is typically negotiated at the start of the communication and used for the duration of the communication. The slot format may also be changed during a communication through channel reconfiguration (via signaling). For certain designs, the user terminal may also be able to autonomously change the slot format, e.g., in case of new handover situation for power controlled channels. New slot format may also be explicitly selected by a network and conveyed together with, or possibly within, a handover message. For the slot formats defined by the W-CDMA standard, the bits in the TPC field for each slot are intended to be used for transmission of a TPC command for DPCH/PDSCH power control.

Table 1 lists slot formats 0 through 5B defined by the W-CDMA standard (version V3.1.1) for the uplink DPCCH. Each slot for the uplink DPCCH includes a number of fields, as shown in FIG. 4. Each slot format in Table 1 defines the length (in number of bits) of each field in the slot. As shown in Table 1, one or more of the fields may be omitted (i.e., length=0) for some of the slot formats.

TABLE 1

| Slot Format | $N_{Pilot}$ | $N_{TPC1}$ | $N_{TPC2}$ | $N_{TFCI}$ | $N_{FBI}$ |
|---|---|---|---|---|---|
| 0 | 6 | 2 | 0 | 2 | 0 |
| 0A | 5 | 2 | 0 | 3 | 0 |
| 0B | 4 | 2 | 0 | 4 | 0 |
| 1 | 8 | 2 | 0 | 0 | 0 |
| 2 | 5 | 2 | 0 | 2 | 1 |
| 2A | 4 | 2 | 0 | 3 | 1 |
| 2B | 3 | 2 | 0 | 4 | 1 |
| 3 | 7 | 2 | 0 | 0 | 1 |
| 4 | 6 | 2 | 0 | 0 | 2 |
| 5 | 5 | 1 | 0 | 2 | 2 |
| 5A | 4 | 1 | 0 | 3 | 2 |
| 5B | 3 | 1 | 0 | 4 | 2 |
| 6 [1] | 6 [8] | 2 | 2 | 0 | 0 |
| 7 [0] | 4 [6] | 2 | 2 | 2 | 0 |
| 7A [0B] | 4 [4] | 1 | 1 | 4 | 0 |
| 7B [0B] | 2 [4] | 2 | 2 | 4 | 0 |
| 8 [4] | 4 [6] | 2 | 2 | 0 | 2 |
| 9 [5] | 2 [5] | 2 | 2 | 2 | 2 |
| 9A [5B] | 2 [3] | 1 | 1 | 4 | 2 |

In accordance with specific embodiments of the invention, new slot formats 6 through 9A in Table 1 are defined to support two feedback substreams. Slot format 6 is based on slot format 1 (as indicated by the [1] in column 1), slot format 7 is based on slot format 0, slot formats 7A and 7B are based on slot format 0B, slot format 8 is based on slot format 4, slot format 9 is based on slot format 5, and slot format 9A is based on slot format 5B. In an embodiment, the new slot formats retain the TFCI and FBI fields of the corresponding "base" slot formats.

For each new slot format, two TPC fields are defined using bits in the TPC field of the base slot format and zero or more pilot bits. For new slot formats 6, 7, 7B, 8, and 9A, the TPC2 field is defined using only bits taken from the pilot field. The number of pilot bits (as indicated within the bracket in column 2) in the base slot format is thus reduced. For example, for slot format 6, the TPC2 field for feedback substream 2 is defined using two pilot bits, thus reducing the number of pilot bits from 8 (for base slot format 1) down to 6. For new slot format 7A, the two bits in the original TPC field are allocated one apiece to the TPC1 and TPC2 fields.

For the new slot formats shown in Table 1, the two TPC fields include the same number of bits. Also, since the two TPC fields are included in each slot, the feedback rate is 1500 cps. The TPC fields may also be defined with different number of bits. Moreover, different bit rates may also be obtained by sending a TPC command over multiple slots. This may reduce the number of pilots bits needed to be taken to implement the second feedback substream. For example, another slot format may be defined based on slot format 6, with the TPC1 field including two bits, the TPC2 field including one bit, and the pilot field including seven bits. The TPC command for the second substream may then be transmitted over two slots to achieve a feedback rate of 750 cps.

Table 1 shows the formation of two TPC fields for two feedback substreams. In general, any number of TPC fields may be defined in a slot. Each TPC field may be assigned for power control of a respective channel.

Defining new slot formats that are additions to existing defined slot formats allow the user terminal and base station to utilize the existing slot formats, which are still valid for many operating scenarios. The new slots format may be selected for use whenever appropriate (e.g., if the PDSCH is assigned during a communication).

If pilot bits are taken to implement the second feedback substream, as for many of the new slot formats listed in Table 1, the pilot power is reduced correspondingly. The user terminal may increase the DPCCH transmit power to allow for proper tracking and demodulation at the base station. If equivalent pilot energy is needed at the base station to achieve similar performance, the DPCCH transmit power may be increased by approximately 1.25 dB (i.e., 10 log (8/6)=1.25 dB) for slot format 6 and approximately 3 dB for slot format 9A, in comparison to the DPCCH transmit power for the corresponding base slot formats 1 and 5B. This increase in DPCCH transmit power is independent of the environment.

The techniques described above may also be used in combination to implement multiple parallel feedback substreams. For example, 1500/750 feedback substreams may be implemented by transmitting the first feedback substream on every slot, and transmitting the second feedback substream along with the first feedback substream on every other slot (e.g., using one of the new slot formats). As another example, 1500/750/750 feedback substreams may be implemented by assigning the first feedback substream to TPC1 on every slot, the second feedback substream to TPC2 on every other slot, and the third feedback substream to TPC2 on alternate slots.

Each feedback substream may be used to transmit any type of information that may be used for power control of the associated channel. The information transmitted on each feedback substream may be, for example, TPC commands, erasure indicator bits (EIBs) or frame status, quality indicator bits (QIBs), SNR estimates, data rate control (DRC) commands, or some other information. The TPC commands, EIBs, and QIBs are typically binary values whereas the SNR estimates and DRC commands may be multi-bit values.

A TPC command requests the base station to adjust the transmit power for the associated channel either up or down by a particular amount (e.g., 0.5 or 1 dB) to allow the user terminal to achieve the target SNR. An EIB indicates whether a frame was received correctly (good) or in error (erased). A QIB indicates whether the current transmit power level is inadequate or adequate. QIB is typically generated based on FER statistic collection whereas TPC is typically generated based on SNR measurements. The base station may elect to implement or ignore each of the received TPC commands, EIBs, or QIBs.

The SNR for a received transmission, as estimated at the user terminal, may also be reported to the base station. The SNR estimates may be quantized to any number of bits, depending on the specific implementation. The estimated SNR may also be translated into a particular data rate supported by a particular transmit power level for a packet data transmission. A DRC command indicative of the supported data rate may be reported and use for power control. A multi-bit feedback may be used to adjust the transmit power or data rate for the transmission on the associated channel in finer granularity than possible with a binary feedback, which may improve performance and capacity. The types of information that may be reported back for power control are described in further detail in U.S. patent application Ser. No. 09/755,659, entitled "METHOD AND APPARATUS FOR POWER CONTROL OF MULTIPLE CHANNELS IN A WIRELESS COMMUNICATION SYSTEM," filed Jan. 5, 2001, assigned to the assignee of the present application and incorporated herein by reference.

Techniques to derive the information that may be reported back for power control are described in further detail in U.S. Pat. No. 6,097,972, entitled "METHOD AND APPARATUS FOR PROCESSING POWER CONTROL SIGNALS IN CDMA MOBILE TELEPHONE SYSTEM," issued Aug. 1, 2000, U.S. Pat. No. 5,903,554, entitled "METHOD AND APPARATUS FOR MEASURING LINK QUALITY IN A SPREAD SPECTRUM COMMUNICATION SYSTEM," issued May 11, 1999, and U.S. Pat. Nos. 5,056,109, and 5,265,119, both entitled "METHOD AND APPARATUS FOR CONTROLLING TRANSMISSION POWER IN A CDMA CELLULAR MOBILE TELEPHONE SYSTEM," respectively issued Oct. 8, 1991 and Nov. 23, 1993, all assigned to the assignee of the present application and incorporated herein by reference.

Figure 6:
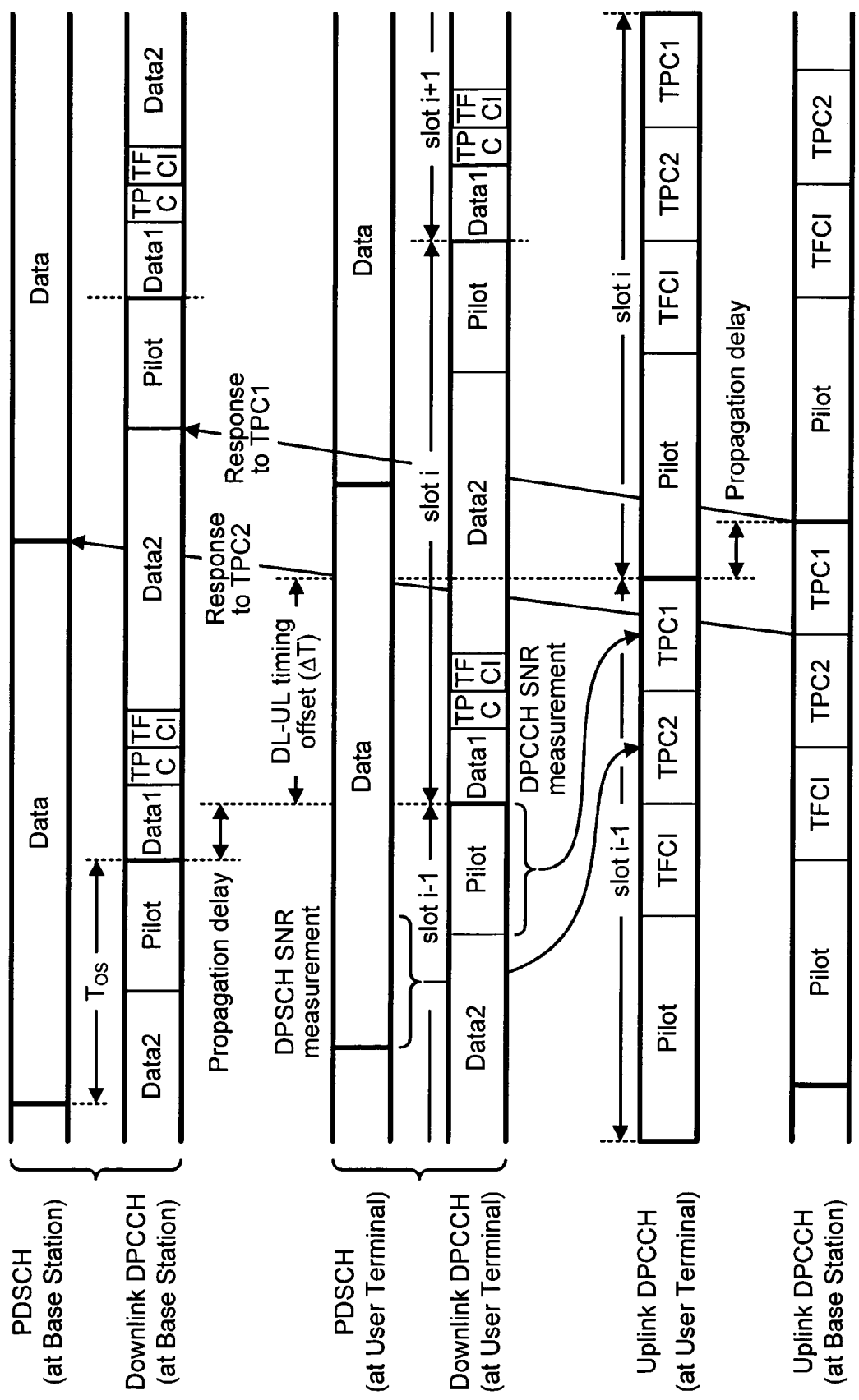
FIG. 6 is a timing diagram illustrating power control for multiple channels, in accordance with an embodiment of the invention.

FIG. 6 is a timing diagram illustrating power control for multiple channels, in accordance with an embodiment of the invention. At the top of FIG. 6, a base station transmits on the downlink PDSCH and DPCCH. The start of the DPCH frame may be denoted as $T_{DPCH}$, and the start of the PDSCH frame may be denoted as $T_{PDSCH}$. In accordance with the W-CDMA standard, each PDSCH frame is associated with one DPCH frame and has the timing relationship $\{-35840 < (T_{DPCH} - T_{PDSCH}) < 2560 \text{ chips}\}$ (i.e., the PDSCH frame starts anywhere between 1 slot before and up to 14 slots behind the start of the associated DPCH frame. The time offset between the start of the slots for the PDSCH and DPCCH is designated as $T_{OS}$ in FIG. 6. Due to propagation delay, $T_{PD}$, the transmissions on the PDSCH and DPCCH are received a short time later at the user terminal.

For power control of the downlink DPCH, the user terminal estimates the SNR of the pilot in slot i−1 of the downlink DPCCH, determines the TPC command corresponding to the estimated SNR, and sends the TPC command in the TPC1 field in slot i−1 of the uplink DPCCH. In accordance with the W-CDMA standard, the frame timing on the uplink DPCH is delayed by 1024 chips from that of the corresponding downlink DPCH, as measured at the user terminal's antenna. After the propagation delay, $T_{PD}$, the base station receives the uplink DPCCH, determines the TPC command in the TPC1 field of slot i−1, and adjusts the transmit power of the downlink DPCH (i.e., the DPCCH and DPDCH) at slot i (if possible).

For power control of the PDSCH, the user terminal also estimates the SNR of the transmission in slot i−1 of the PDSCH, and determines the TPC command corresponding to the estimated SNR. For the embodiment shown in FIG. 6 wherein multiple feedback substreams are formed with multiple TPC fields, the user terminal sends the TPC command for the PDSCH in the TPC2 field in slot i−1 of the uplink DPCCH. Again, after the propagation delay, $T_{PD}$, the base station receives the uplink DPCCH, determines the TPC command in the TPC2 field of slot i−1, and adjusts the transmit power of the PDSCH at slot i (if possible). For an embodiment wherein the feedback substreams are formed by time-sharing slots in the feedback stream, the user terminal may send the TPC command for the PDSCH in the TPC field in a subsequent slot of the uplink DPCCH (not shown in FIG. 6).

As indicated in FIG. 6, the received transmission is measured and power control information is generated and reported back as quickly as possible by the user terminal. The base station similarly applies the power control as soon as possible (within one slot in many instances). The short delay improves. the performance of the power control mechanism. If power adjustment within one slot is not possible (due to long propagation delay or uncertain time offset between the PDSCH and DPCCH), the base station can adjust the transmit power at the nearest available slot.

The timing in FIG. 6 is typically dependent on various factors such as how the power control command is derived. If the other channels (PDSCH) include dedicated pilot bits, then the timing may be selected to minimize the feedback delay, which typically depends on the pilot bit position. In case of PDSCH and if the techniques described in the aforementioned U.S. Pat. Nos. 6,097,972 or 5,903,554 are used, the measurement may be made on a common (continuous) pilot, and the timing may be derived backward so that the power control decision is completed just prior to when the uplink transmission bin is available.

Figure 7:
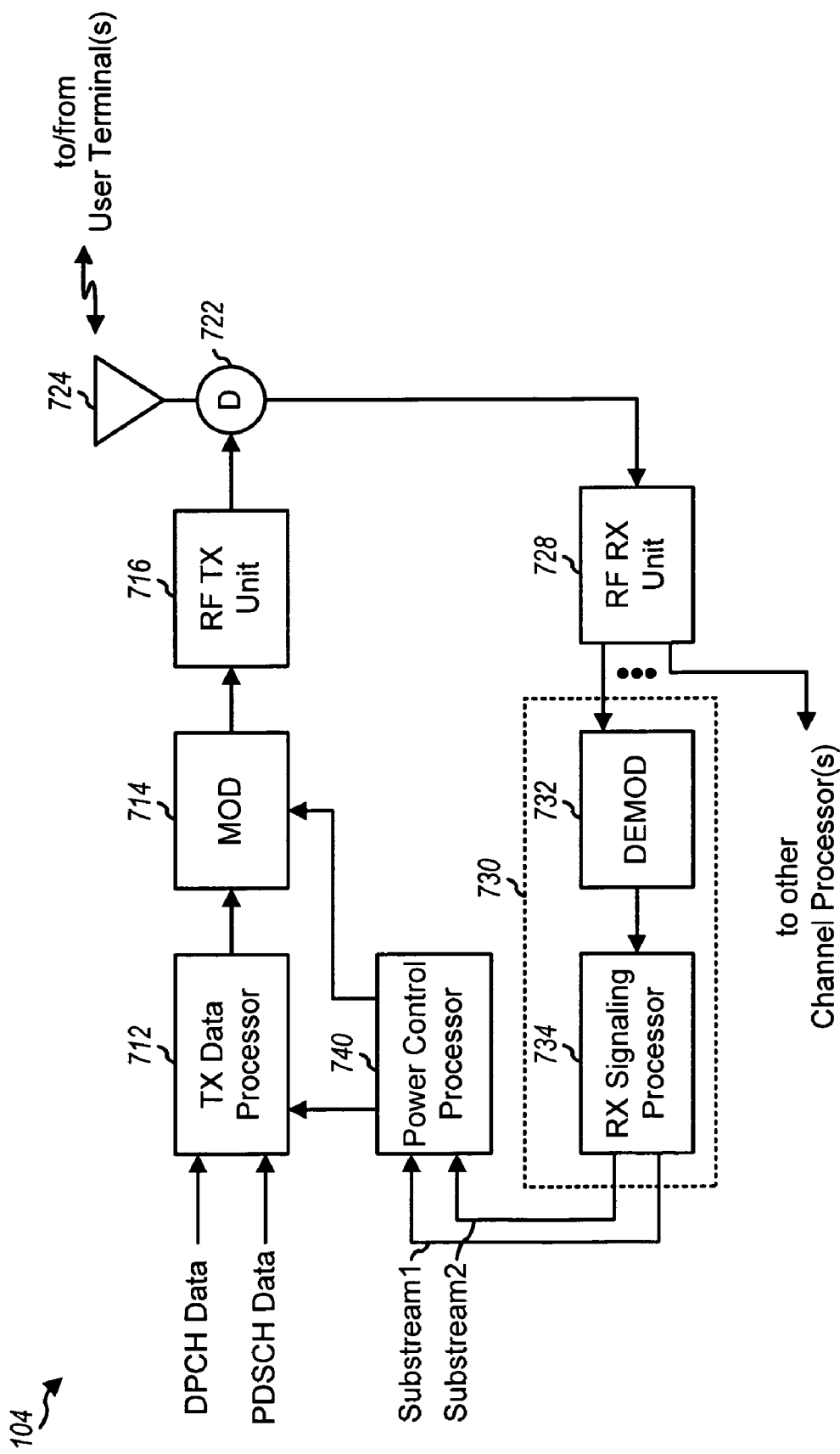
FIGS. 7 and 8 are block diagrams of an embodiment of the base station and the user terminal, respectively, which are capable of implementing various aspects and embodiments of the invention.

FIG. 7 is a block diagram of an embodiment of base station 104, which is capable of implementing certain aspects and embodiments of the invention. On the downlink, data for the DPCH and PDSCH for a particular user terminal is received and processed (e.g., formatted, encoded) by a transmit (TX) data processor 712. The processing for the DPCH and PDSCH may be as described above in FIG. 2A, and the processing (e.g., encoding, covering, and so on) for each channel may be different from that of the other channel. The processed data is then provided to a modulator (MOD) 714 and further processed (e.g., covered, spread with short PN sequences, and scrambled with a long PN sequence assigned to the recipient user terminal). The modulated data is then provided to an RF TX unit 716 and conditioned (e.g., converted to one or more analog signals, amplified, filtered, and quadrature modulated) to generate a downlink signal. The downlink signal is routed through a duplexer (D) 722 and transmitted via an antenna 724 to the recipient user terminal.

Figure 8:
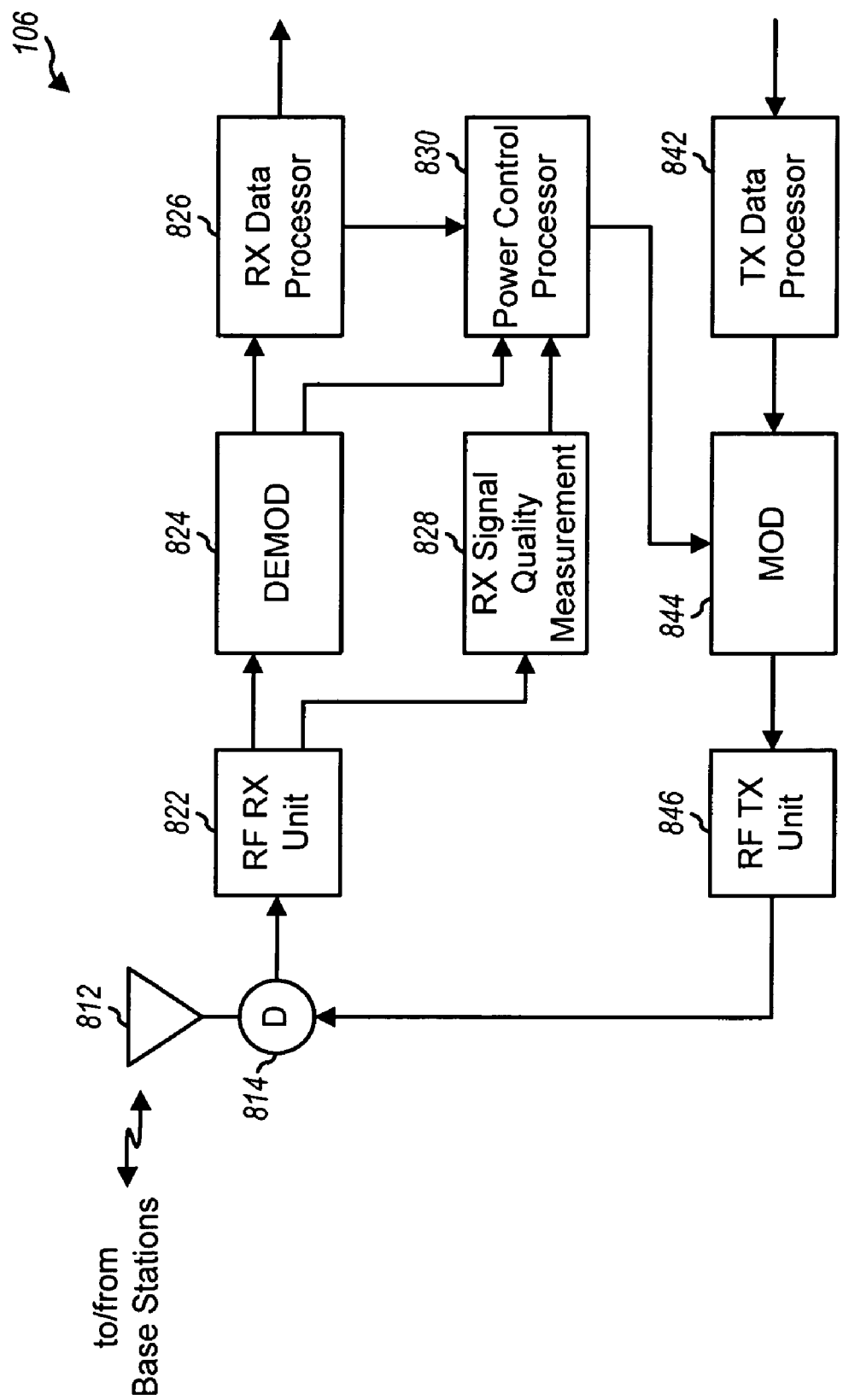

FIG. 8 is a block diagram of an embodiment of user terminal 106. The downlink signal is received by an antenna 812, routed through a duplexer 814, and provided to an RF receiver unit 822. RF receiver unit 822 conditions (e.g., filters, amplifies, downconverts, and digitizes) the received signal and provides samples. A demodulator 824 receives and processes (e.g., despreads, decovers, and pilot demodulates) the samples to provide recovered symbols. Demodulator 824 may implement a rake receiver that processes multiple instances of the received signal and generates combined recovered symbols. A receive (RX) data processor 826 then decodes the recovered symbols for each transmission, checks the received frames, and provides the output data. Demodulator 824 and RX data processor 826 may be operated to process multiple transmissions received via multiple channels, such as the DPCH and PDSCH. The processing by demodulator 824 and RX data processor 826 may be as described above in FIG. 2B.

For downlink power control, the samples from RF receiver unit 822 may also be provided to an RX signal quality measurement unit 828 that estimates the SNR of the transmissions on the downlink DPCH and PDSCH. The SNR for each channel can be estimated using various techniques, such as those described in the aforementioned U.S Pat. Nos. 6,097,972, 5,903,554, 5,056,109, and 5,265,119.

The SNR estimates for the DPCH and PDSCH are provided to a power control processor 830, which compares the estimated SNR for each channel to the channel's setpoint, and generates the appropriate power control information (which may be in the form of TPC commands). The power control information for the DPCH and PDSCH is sent back to the base station via two power control feedback substreams.

Power control processor 830 may also receive other metrics for other channels being processed. For example, power control processor 830 may receive erasure indicator bits from RX data processor 826 for transmissions on the DPCH and PDSCH. For each frame period, RX data processor 826 may provide to power control processor 830 frame status (i.e., an indication whether the received frame is good or bad, or that no frame was received), QIB, or some other types of information. Power control processor 830 may then send the received information back to the base station.

On the uplink, data is processed (e.g., formatted, encoded) by a transmit (TX) data processor 842, further processed (e.g., covered, spread) by a modulator (MOD) 844, and conditioned (e.g., converted to analog signals, amplified, filtered, and quadrature modulated) by an RF TX unit 846 to generate a uplink signal. The power control information from power control processor 830 may be multiplexed with the processed data within modulator 844. The uplink signal is routed through duplexer 814 and transmitted via antenna 812 to one or more base stations 104.

Referring back to FIG. 7, the uplink signal is received by antenna 724, routed through duplexer 722, and provided to an RF receiver unit 728. RF receiver unit 728 conditions (e.g., downconverts, filters, and amplifies) the received signal and provides a conditioned uplink signal for each user terminal being received. A channel processor 730 receives and processes the conditioned signal for one user terminal to recover the transmitted data and power control information. A power control processor 740 receives the information (e.g., TPC commands, EIBs, QIBs, and so on, or a combination thereof) for the two feedback substreams and generates appropriate control signals used to adjust the transmit power for the DPCH and PDSCH.

Back in FIG. 8, power control processor 830 implements part of the inner and outer loops described above. For the inner loop of each independently power controlled channel, power control processor 830 receives the estimated SNR and sends back information (e.g., TPC commands) via the assigned feedback substream. For the outer loop, power control processor 830 receives the indication of good, bad, or no frame from data processor 826 and adjusts the setpoint for the channel accordingly. In FIG. 7, power control processor 740 also implements part of the power control loops described above. Power control processor 740 receives information on the feedback substreams and accordingly adjusts the transmit power of the transmissions on the DPCH and PDSCH.

The power control described herein can be implemented by various means. For example, power control can be implemented with hardware, software, or a combination thereof. For a hardware implementation, the elements in the power control can be implemented within one or more application specific integrated circuits (ASICs), digital signal processors (DSPs), programmable logic devices (PLDs), controllers, micro-controllers, microprocessors, other electronic units designed to perform the functions described herein, or a combination thereof.

For a software implementation, the elements in the power control can be implemented with modules (e.g., procedures, functions, and so on) that perform the functions described herein. The software code can be stored in a memory unit and executed by a processor (e.g., power control processor 740 or 830).

For clarity, various aspects, embodiments, and features of the multiple parallel feedback substreams have been specifically described for downlink power control. The techniques described herein may also be used for uplink power control. Also for clarity, various details of the multiple parallel feedback substreams have been described specifically for the W-CDMA standard. The techniques described herein may also be used to implement multiple parallel feedback substreams in other communication systems (e.g., other CDMA-based systems).

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for controlling transmit power for a data transmission in a wireless communication system, comprising:
   processing data for transmission on a power-controlled channel comprised of one or more data channels, wherein each data channel is associated with a respective set of one or more available formats, wherein each format identifies a specific set of parameter values for processing data, and wherein at any given time instance a specific format is selected for use for each of the one or more data channels from the associated set of one or more available formats;
   specifying a particular performance metric for each selected format for each of the one or more data channels; and
   transmitting the data for the one or more data channels at a particular transmit power level to achieve the performance metric specified for each format selected for use.

2. The method of claim 1, wherein the specified performance metric for each selected format is a particular target block error rate (BLER).

3. The method of claim 1, wherein the specified performance metric for each selected format is a particular target frame error rate (FER).

4. The method of claim 1, wherein the specified performance metric for each selected format is a particular target bit error rate (BER).

5. The method of claim 1, wherein each format is further associated with a respective setpoint required to achieve the specified performance metric.

6. The method of claim 5, wherein the transmit power level for the data transmission is determined based on setpoints maintained for the available formats.

7. The method of claim 1, wherein the wireless communication system is a CDMA system.

8. The method of claim 7, wherein the each data channel corresponds to a transport channel and each available format corresponds to a respective transport format.

9. The method of claim 1, wherein the wireless communication system is an IS-95 CDMA system.

10. The method of claim 1, wherein the wireless communication system is a cdma2000 system.

11. A method for controlling transmit power for a data transmission in a wireless communication system, comprising:
    receiving the data transmission including at least one data block on a power-controlled channel comprised of one or more data channels, wherein each data channel is associated with a respective set of one or more available formats, wherein each format identifies a specific set of parameter values for processing data, and wherein at any given time instance a specific format is used for each of the one or more data channels and is selected from the associated set of one or more available formats;
    determining a status of each data block received on the one or more data channels for a current time interval; and
    for each format used in the current time interval, adjusting a setpoint for the format based at least in part on the status of one or more data blocks received on the data channel that uses the format, and wherein the transmit power for the data transmission is adjusted based on a reference setpoint derived based on at least one setpoint for at least one available format.

12. The method of claim 11, wherein the setpoint for each format is a particular target signal-to-noise-plus-interference ratio (SNIR).

13. The method of claim 11, wherein the reference setpoint is derived as a articular function of the setpoints for all available formats.

14. The method of claim 11, wherein the reference setpoint is derived as the maximum of the setpoints for all available formats.

15. The method of claim 11, wherein the reference setpoint is derived as a maximum of the one or more setpoints for the one or more formats used in a current time interval.

16. The method of claim 11, wherein the reference setpoint is derived as a maximum of a plurality of setpoints for a plurality of formats.

17. The method of claim 11, wherein the setpoint for each available format is adjusted upward if any data block in the current time interval was received in error.

18. The method of claim 11, wherein the setpoint for each format used in the current time interval is adjusted upward if any data block in the current time interval was received in error.

19. The method of claim 11, wherein the setpoint for each format used in the current time interval is adjusted downward if all data blocks in the current time interval were received without error.

20. The method of claim 11, wherein the setpoint for the format used to derive the reference setpoint is adjusted downward if all data blocks in the current time interval were received without error.

21. The method of claim 11, wherein the setpoint for each format is further adjusted to achieve a particular level of performance specified for the format.

22. The method of claim 21, wherein the particular level of performance is a particular target block error rate (BLER), frame error rate (FER), or bit error rate (BER).

23. The method of claim 21, wherein a single target level of performance is specified for all available formats.

24. The method of claim 21, wherein a plurality of target levels of performance are specified for all available formats.

25. The method of claim 11, wherein the wireless communication system is a W-CDMA system, and wherein the each data channel corresponds to a transport channel and each available format corresponds to a respective transport format.

26. The method of claim 11, wherein the wireless communication system is an IS-95 or cdma2000 system.

27. A method for controlling transmit power for a data transmission in a wireless communication system, comprising:
processing data for transmission on a power-controlled channel comprised of one or more data channels, wherein each data channel is associated with a respective set of one or more available slot formats, wherein each slot format identifies a specific set of parameter values for processing data, and wherein at any given time instance a specific slot format is selected for use for each of the one or more data channels from the associated set of one or more available slot formats;
determining a power offset associated with each of one or more slot formats selected for use in a current time interval for the one or more data channels; and
transmitting the data for the one or more data channels at a particular transmit power level determined based in part on one or more power offsets for the one or more selected slot formats,
wherein each of the one or more data channels is configured to carry at least one frame with a plurality of control fields within a given slot, and
wherein the specific set of parameter values for each slot format designates the size of the plurality of control fields within the given slot.

28. The method of claim 27, wherein the transmit power level for the data transmission is further determined based on a reference power level.

29. The method of claim 28, wherein the reference power level is indicative of the transmit power for a reference portion included in the data transmission.

30. The method of claim 28, wherein the reference power level is indicative of the transmit power for a pilot included in the data transmission.

31. The method of claim 28, further comprising:
receiving power control commands indicative of requested changes to the transmit power for the data transmission; and
adjusting the reference power level based on the received power control commands.

32. The method of claim 27, wherein the transmit power level is determined based on a maximum of the one or more power offsets.

33. The method of claim 27, wherein the data for each data channel is transmitted at a respective transmit power level determined based in part on the power offset for the selected slot format.

34. The method of claim 27, further comprising: receiving updates for the one or more power offsets for the one or more selected slot formats.

35. The method of claim 27, wherein the wireless communication system is a W-CDMA system.

36. The method of claim 27, wherein the wireless communication system is an IS-95 or edma2000 system.

37. The method of claim 27, wherein the plurality of control fields include at least one of a pilot field, a transport format combination indicator (TFCI) field, a feedback information (FBI) field, or a transmit power control (TPC) field.

38. A method for controlling transmit power for a data transmission in a wireless communication system, comprising:
receiving the data transmission including at least one data block on a power-controlled channel comprised of one or more data channels, wherein each data channel is associated with a respective set of one or more available formats, wherein each format identifies a specific set of parameter values for processing data, wherein at any given time instance a specific format is used for each of the one or more data channels and is selected from the associated set of one or more available formats, and wherein data for the one or more data channels is transmitted at a particular transmit power level determined based in part on one or more power offsets for one or more formats selected for use in a current time interval for the one or more data channels;
determining a status of each data block received in the current time interval on the one or more data channels; and
for each format used in the current time interval, updating a setpoint for the format based at least in part on the status of one or more data blocks received on the data channel that uses the format.

39. The method of claim 38, further comprising:
for each format used in the current time interval, deriving a power offset update associated with the format based at least in part on the updated setpoint and a reference setpoint.

40. The method of claim 38, further comprising: for each format used in the current time interval, updating the power offset associated with the format based at least in part on the updated setpoint and a reference setpoint.

41. The method of claim 38, further comprising:
deriving a reference setpoint for controlling the transmit power for the data transmission.

42. The method of claim 41, further comprising:
deriving power control commands to adjust the transmit power for the data transmission based on the determined signal quality of the reference portion and the reference setpoint.

43. The method of claim 42, wherein the reference portion is a pilot.

44. The method of claim 41, wherein the reference setpoint is derived based on setpoints for all available formats.

45. The method of claim 41, wherein the reference setpoint is derived based on the one or more setpoints for the one or more formats used in the current time interval.

46. The method of claim 41, wherein the reference setpoint is derived as a maximum of a plurality of setpoints for a plurality of formats.

47. The method of claim 38, further comprising: transmitting at least one update for at least one power offset for at least one format.

48. The method of claim 47, wherein the at least one power offset update is transmitted periodically at a particular update time interval.

49. The method of claim 47, wherein power offset updates for each data channel are transmitted periodically at a particular update time interval.

50. The method of claim 47, wherein the power offset update for each format is transmitted periodically at a particular update time interval.

51. The method of claim 47, wherein the at least one power offset update transmitted upon fulfillment of one or more criteria.

52. The method of claim 51, wherein the one or more criteria are fulfilled if a maximum change for the at least one updated power offset exceeds a particular threshold.

53. The method of claim 47, wherein each power offset update is transmitted if its change from a previously transmitted value exceeds a particular threshold.

54. The method of claim 38, wherein the wireless communication system is a W-CDMA system.

55. The method of claim 38, wherein the wireless communication system is an IS-95 or cdma2000 system.

56. A power control unit in a wireless communication system, comprising:
 a first power control loop operative to receive an indication of a signal quality of a received data transmission and a reference setpoint, and to derive power control commands based on the indicated signal quality and the reference setpoint; and
 a second power control loop coupled to the first power control loop and operative to receive status of one or more data blocks in the data transmission and to adjust a setpoint for each of one or more formats used for the data transmission, and wherein the one or more formats are selected from among a plurality of available formats, and wherein the reference setpoint is derived based on at least one setpoint for at least one available format.

57. The power control unit of claim 56, wherein each available format is associated with a respective setpoint.

58. The power control unit of claim 56, wherein each available format is associated with a respective target block error rate (BLER).

59. The power control unit of claim 56, wherein each available format is associated with a respective power offset indicative of the transmit power to be used for the format relative to a reference power level.

60. The power control unit of claim 59, further comprising:
 a third power control loop coupled to the second loop and operative to provide a transmitter with the power offset or a power offset update for each of the one or more formats used for the data transmission.

61. An apparatus for controlling transmit power in a wireless communication system, comprising:
 means for receiving an indication of a signal quality of a received data transmission and a reference setpoint, and to derive power control commands based on the indicated signal quality and the reference setpoint; and
 means for receiving status of one or more data blocks in the data transmission and to adjust a setpoint for each of one or more formats used for the data transmission, wherein the one or more formats are selected from among a plurality of available formats, and wherein the reference setpoint is derived based on at least one setpoint for at least one available format.

62. The apparatus of claim 61, further comprising:
 means for providing a transmitter with a power offset or a power offset update for each of the one or more formats used for the data transmission.

63. A power control unit for use in a wireless communication system, comprising:
 a signal quality measurement unit operative to receive and process a data transmission to determine a signal quality of the data transmission;
 a receive data processor operative to process the data transmission to determine status of one or more data blocks received in a current time interval from the data transmission; and
 a power control processor coupled to the signal quality measurement unit and operative to receive the determined signal quality and derive power control commands based on the determined signal quality and a reference setpoint, receive the status of the one or more data blocks for the current time interval and adjust a setpoint for each of one or more formats used in the current time interval for the data transmission, wherein the one or more formats are selected from among a plurality of available formats, and derive the reference setpoint based on at least one setpoint for at least one transport available format.

64. The power control unit of claim 63, wherein the power control processor is further operative to maintain a power offset for each of the one or more formats used in the current time interval for the data transmission.

65. An apparatus for controlling transmit power in a wireless communication system, comprising:
 means for receiving and processing a data transmission to determine a signal quality of the data transmission;
 means for processing the data transmission to determine status of one or more data blocks received in a current time interval from the data transmission;
 means for receiving the determined signal quality and deriving power control commands based on the determined signal quality and a reference setpoint;
 means for receiving the status of the one or more data blocks for the current time interval and adjusting a setpoint for each of one or more formats used in the current time interval for the data transmission, wherein the one or more formats are selected from among a plurality of available formats; and
 means for deriving the reference setpoint based on at least one setpoint for at least one transport available format.

66. The apparatus of claim 65, further comprising;
 means for deriving a power offset or a power offset update for each of the one or more formats used in the current time interval for the data transmission.

67. An apparatus for controlling transmit power for a data transmission in a wireless communication system, comprising:
 means for processing data for transmission on a power-controlled channel comprised of one or more data channels, wherein each data channel is associated with a respective set of one or more available formats, wherein each format identifies a specific set of parameter values for processing data, and wherein at any given time instance a specific format is selected for use for each of the one or more data channels from the associated set of one or more available formats;
 means for specifying a particular performance metric for each selected format for each of the one or more data channels; and
 means for transmitting the data for the one or more data channels at a particular transmit power level to achieve the performance metric specified for each format selected for use.

68. The apparatus of claim 67, wherein the specified performance metric for each selected format is at least one of a particular target block error rate (BLER), a particular target frame error rate (FER), or a particular target bit error rate (BER).

69. The apparatus of claim 67, wherein each format is further associated with a respective setpoint required to achieve the specified performance metric.

70. The apparatus of claim 67, wherein the transmit power level for the data transmission is determined based on setpoints maintained for the available formats.

71. The apparatus of claim 67, wherein the wireless communication system is at least one of a W-CDMA system, an IS-95 CDMA system, or a cdma2000 system.

72. The apparatus of claim 71, wherein the each data channel corresponds to a transport channel and each available format corresponds to a respective transport format.

73. A non-transitory computer-readable medium containing instructions stored thereon, which, when executed by a processor, cause the processor to perform actions for controlling transmit power for a data transmission in a wireless communication system, the non-transitory computer-readable medium comprising:

instruction to process data for transmission on a power-controlled channel comprised of one or more data channels, wherein each data channel is associated with a respective set of one or more available formats, wherein each format identifies a specific set of parameter values for processing data, and wherein at any given time instance a specific format is selected for use for each of the one or more data channels from the associated set of one or more available formats;

instruction to specify a particular performance metric for each selected format for each of the one or more data channels; and instruction to transmit the data for the one or more data channels at a particular transmit power level to achieve the performance metric specified for each format selected for use.

* * * * *